(12) United States Patent
Nagata et al.

(10) Patent No.: US 6,540,447 B2
(45) Date of Patent: Apr. 1, 2003

(54) THROWAWAY INSERT AND THROWAWAY-TYPE CUTTER

(75) Inventors: Rikihiko Nagata, Yuuki-gun (JP); Hiroshi Shimomura, Yuuki-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/819,852

(22) Filed: Mar. 29, 2001

(65) Prior Publication Data

US 2001/0051077 A1 Dec. 13, 2001

(30) Foreign Application Priority Data

May 23, 2000 (JP) ........................... 2000-152001
Mar. 26, 2001 (JP) ........................... 2001-088502

(51) Int. Cl.⁷ ............................ B23B 27/22; B23P 15/28
(52) U.S. Cl. .................................. 407/35; 407/114
(58) Field of Search ......................... 407/114, 35, 43, 407/113, 115–116

(56) References Cited

U.S. PATENT DOCUMENTS

| | | | |
|---|---|---|---|
| 4,699,549 A | | 10/1987 | Shimomura et al. |
| 5,052,863 A | * | 10/1991 | Satran ..................... 407/113 |
| 5,082,401 A | * | 1/1992 | Niebauer .................. 407/114 |
| 5,388,932 A | * | 2/1995 | DeRoche et al. ......... 407/113 |
| 5,577,867 A | * | 11/1996 | Paya ........................ 407/114 |
| 5,810,521 A | * | 9/1998 | Pantzar et al. ........... 407/114 |
| 5,904,450 A | | 5/1999 | Satran et al. |
| 5,951,214 A | * | 9/1999 | Rothballer et al. ....... 407/42 |
| 6,142,716 A | * | 11/2000 | Jordberg et al. ......... 407/114 |
| 6,196,770 B1 | | 3/2001 | Astrom et al. ........... 407/40 |
| 6,257,807 B1 | * | 7/2001 | Heinloth .................. 407/113 |

FOREIGN PATENT DOCUMENTS

| | | |
|---|---|---|
| JP | 61-195913 | 12/1986 |
| JP | 61-201719 | 12/1986 |
| JP | 62-22014 | 2/1987 |
| JP | 62-32709 | 2/1987 |
| JP | 62-32714 | 2/1987 |
| JP | 62-32717 | 2/1987 |
| JP | 62-32718 | 2/1987 |
| JP | 62-35712 | 3/1987 |
| JP | 62-35713 | 3/1987 |
| JP | 8-300214 | 11/1996 |
| JP | 10-277830 | 10/1998 |
| JP | 11-33815 | 2/1999 |
| JP | 11-114718 | 4/1999 |
| JP | 11-226812 | 8/1999 |

* cited by examiner

Primary Examiner—Derris H. Banks
Assistant Examiner—Jamila Williams
(74) Attorney, Agent, or Firm—Oblon, Spivak, McClelland, Maier & Neustadt, P.C.

(57) ABSTRACT

A rhombic cutting insert includes cutting edges merging with each other at a nose part disposed at a diagonal acute-angle corner of an upper face of the insert. The cutting edges each form convex-curved shapes and are each inclined with respect to a mounting face of the insert. The cutting edges each include linear sub-cutting-edges, disposed in the vicinity of the nose part, forming a substantially right angle therebetween. Rake faces are formed on the upper face of the insert and each have positive rake angles and twisted-inclined surfaces. The insert is mounted on a tool part. One cutting edge serves as a peripheral cutting edge having a sub-cutting-edge disposed substantially parallel to an axis of the tool part, and the other cutting edge serves as a facing cutting edge having a sub-cutting-edge disposed substantially perpendicular to the axis of the tool part.

11 Claims, 6 Drawing Sheets

THROWAWAY INSERT AND THROWAWAY-TYPE CUTTER

BACKGROUND OF THE INVENTION

1. Field of the Invention

The present invention relates to throwaway inserts (the term "insert" hereinafter referred to represents a throwaway insert) to be used for cutting by being mounted to throwaway-type cutters such as end mills. The present invention also relates to throwaway-type cutters having the throwaway inserts mounted thereto.

2. Description of the Related Art

Hitherto, a milling machine, which is disclosed in, for example, Japanese Unexamined Patent Application Publication No. 11-226812, has been known as a rotating tool used for cutting, such as plunging-milling and three-dimensional cutting. The milling machine is mounted with substantially rhombic-planar-shaped throwaway-inserts. A cutting edge used as a peripheral cutting edge when the throwaway insert is mounted to a tool part is provided with a sub-cutting-edge at a corner of the throwaway insert, the sub-cutting-edge being disposed in parallel to the rotational axis of the tool part. The cutting edge of the throwaway insert, which serves as a facing cutting edge when the throwaway insert is mounted to the tool part, has a sub-cutting-edge angle of 0.5 to 10 degrees.

Therefore, when the milling machine is transferred vertically so as to be used for plunging-milling, finish-machining can be performed by using the sub-cutting-edge of the peripheral cutting edge. however, when the milling machine is transferred horizontally, finish-machining cannot be performed because the facing cutting edge has the sub-cutting-edge angle; therefore, the insert must be replaced by another insert for finishing. Because of the same reason, there is a problem in that the insert, which is used in a right-hand tool part, cannot be used in a left-hand tool part.

There is another problem in that since the insert has a substantially planar shape, when the insert is mounted to a tool part so as to have a negative radial rake angle, the sharpness of the cutting edge is reduced and cutting resistance is increased although the thickness of a back metal part of an insert-mounting base can be designed to be large.

SUMMARY OF THE INVENTION

Accordingly, it is an object of the present invention to provide a throwaway insert which can be used for plunging-milling and transverse cutting and for finish-cutting, and a throwaway-type cutter using the throwaway insert.

To these ends, according to an aspect of the present invention, a throwaway insert comprises a pair of cutting edges merging with each other at a nose part of an upper face opposite to a mounting face. The pair of cutting edges are individually formed inclined so as to be closer to the mounting face from the nose part toward portions of the respective cutting edges apart from the nose part and individually include sub-cutting-edges in the vicinity of the nose part. The sub-cutting-edges form a substantially right angle therebetween.

Since the pair of cutting edges individually include the sub-cutting-edges in the vicinity of the nose part, which are disposed substantially perpendicular to each other, the sub-cutting-edge of the peripheral cutting edge and the sub-cutting-edge of the facing cutting edge function as finish-cutting edges when plunging-milling and traverse cutting, respectively, whereby finish-cutting such as finish-machining and medium-rough-finish-machining can be performed other than rough cutting. By individually providing the sub-cutting-edges at both sides of the nose part, a cutting insert regardless of handling can be obtained which can be mounted to either a right-hand tool part or a left-hand tool part. Since each cutting edge of the cutting insert is inclined with respect to the mounting face of the insert at which the insert is mounted to a tool part, the radial rake angle of the cutting edge is set, when mounted, so that the inner side end of the cutting edge is offset toward the trailing side of the rotation of the tool part with respect to the outer side end of the cutting edge, whereby sharpness of the cutting edge can be improved and cutting resistance can be reduced.

The sub-cutting-edges may be individually formed substantially in straight lines.

With the sub-cutting-edges thus formed, superior finish machining and medium-rough-finish machining can be performed.

The pair of cutting edges may be individually formed in a convex-curved shape. The cutting edges may be also convex-curve-shaped in a horizontal direction.

By forming the cutting edges in a convex-curved shape, the impact against the cutting edges when the cutting edges cut into a workpiece can be reduced. When the depth of cut is small, the cutting edge cuts into the workpiece at the end of the nose part, and when the depth of cut is large, the cutting edge cuts into the workpiece at an inner part of the cutting edge. Cut regions gradually expand from the cut-in points, whereby the impact on the cutting edge can be reduced and damages to the cutting edge can be suppressed.

The pair of cutting edges may form an acute angle of smaller than ninety degrees, for example, eighty degrees therebetween at the respective portions continuing from the sub-cutting-edges.

The throwaway insert may be formed in a substantially quadrilateral-planar shape, a pair of the nose parts of the upper face may be individually provided at corners, opposite to each other, of the substantially quadrilateral-planar throwaway insert, and rake faces on the upper face may be individually formed inclined so that the distances of the rake faces to a lower face individually decrease from the nose parts toward a diagonal line between a pair of the remaining corners of the substantially quadrilateral-planar throwaway insert.

Cut chips produced by the peripheral cutting edge and facing cutting edge are guided along the upper face to a portion along the diagonal line, and are curled and broken. The broken chips are discharged to the tool-part base-end side along the upper face along the diagonal line.

A throwaway-type cutter according to the present invention comprises a throwaway insert having the above-described configuration. The throwaway insert is mounted so that the nose part is positioned at the periphery of an end of a tool part. One of the pair of cutting edges serves as a peripheral cutting edge, the sub-cutting-edge of the one of the pair of cutting edges being disposed substantially in parallel to an axis of the tool part, and the other one of the pair of cutting edges serves as a facing cutting edge, the sub-cutting-edge of the other one of the pair of cutting edges being disposed substantially perpendicular to the axis of the tool part.

With this arrangement, the sub-cutting-edge of the peripheral cutting edge and the sub-cutting-edge of the facing cutting edge function as finish-cutting edges when plunging-milling and traverse cutting, respectively, whereby finish-cutting such as finish-machining and medium-rough-finish-machining can be performed other than rough cutting. By individually providing the sub-cutting-edges at both sides of the nose part, a cutting insert regardless of handling can be obtained which can be mounted to either a right-hand tool part or a left-hand tool part. Since each cutting edge of the cutting insert is formed inclined with respect to the mounting face of the insert at which the insert is mounted to a tool part, the radial rake angle of the cutting edge is set, when mounted, so that the inner side end of the cutting edge is offset toward the trailing side of the rotation of the tool part with respect to the outer side end of the cutting edge, whereby sharpness of the cutting edge can be improved and cutting resistance can be reduced.

In the throwaway-type cutter according to the present invention, the throwaway insert may be mounted in an insert pocket of the tool part in a manner such that a surface disposed in a region at a tool-part base-end side of the throwaway insert mounted in the insert pocket is inclined to the mounting face of the throwaway insert (to the trailing side of the rotation of the tool part) from the inner side of the tool part toward the outer side thereof.

The cut chips transferred to the base end side of the throwaway insert, when cutting, are guided along the inclined surface toward the peripheral side and are discharged to the outside.

A surface of the insert pocket may be inclined to the mounting face side of the throwaway insert (to the trailing side of the rotation of the tool part) from the inner side of the tool part toward the outer side thereof along a ridgeline opposite to the facing cutting edge of the throwaway insert.

The cut chips moving along the rake face of the upper face of the insert and transferred toward the base end side are smoothly transferred to the inclined surface of the insert pocket, and are discharged toward the base end side from the inclined surface.

DESCRIPTION OF THE PREFERRED EMBODIMENTS

Embodiments according to the present invention are described below with reference to the attached drawings.

Figure 1:
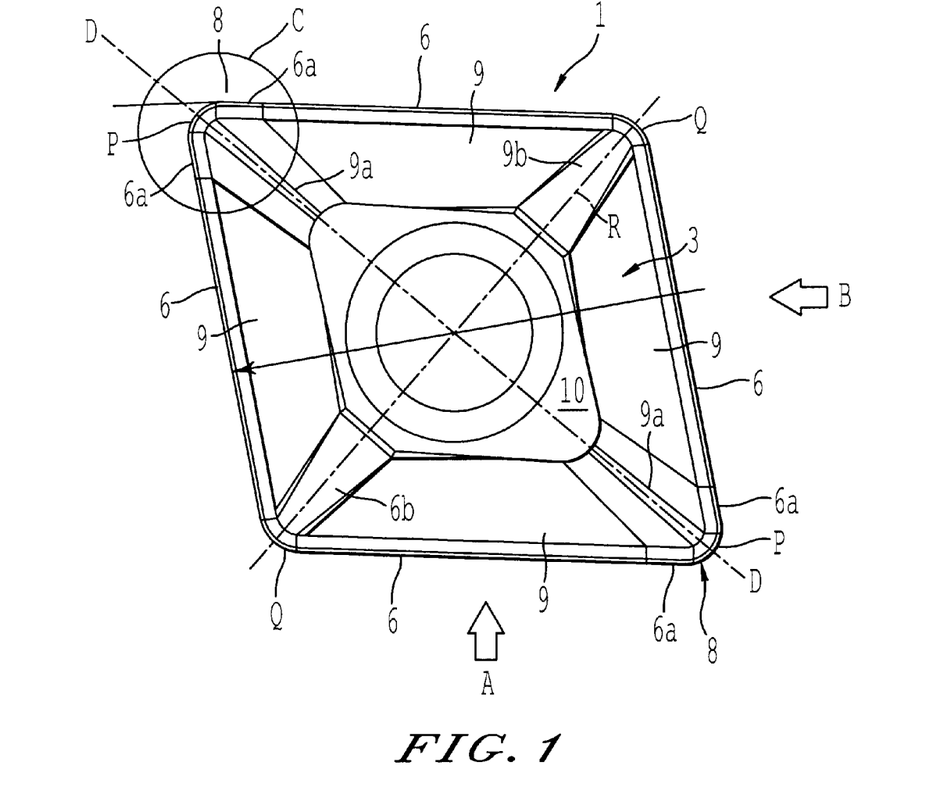
FIG. 1 is a plan view of a throwaway insert according to an embodiment of the present invention.
Figure 2:
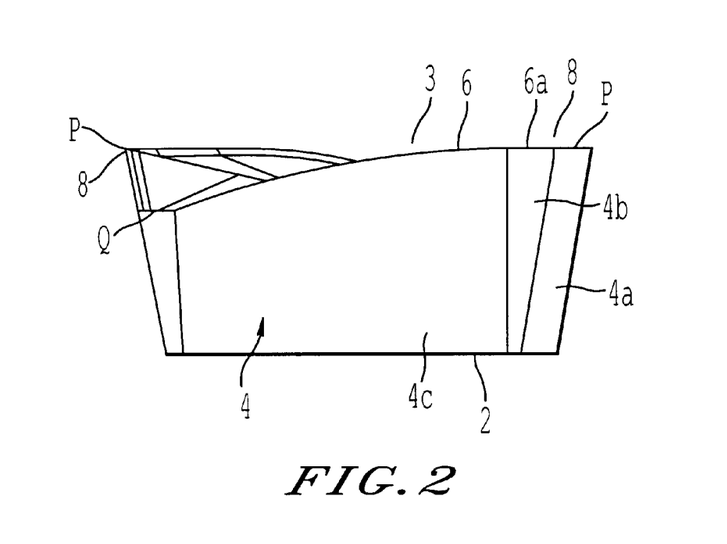
FIG. 2 is a side view in a direction A of the throwaway insert shown in FIG. 1.
Figure 3:
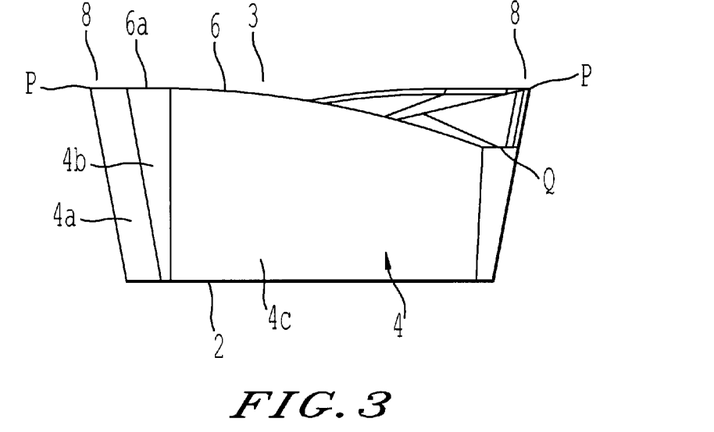
FIG. 3 is a side view in a direction B of the throwaway insert shown in FIG. 1.
Figure 4:
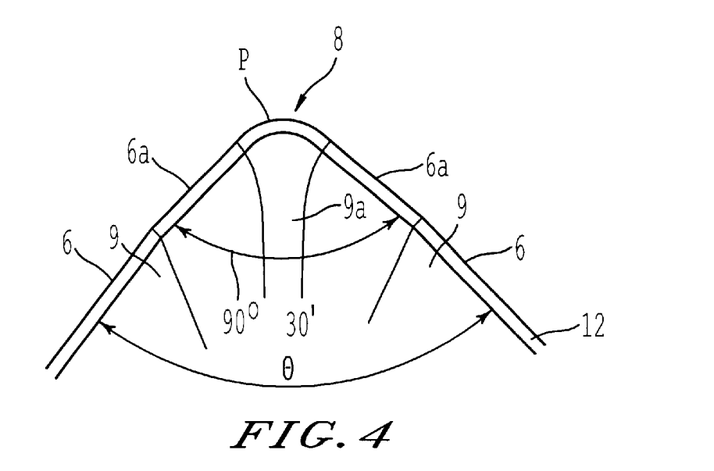
FIG. 4 is an expanded view of a portion C of the throwaway insert shown in FIG. 1.
Figure 5:
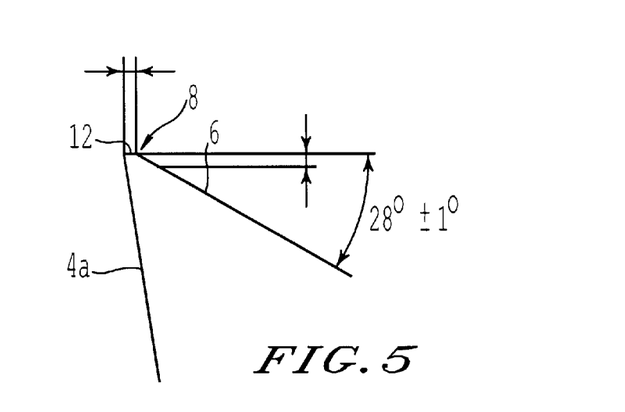
FIG. 5 is a partial side view of a nose part of the throwaway insert shown in FIG. 4.
Figure 6:
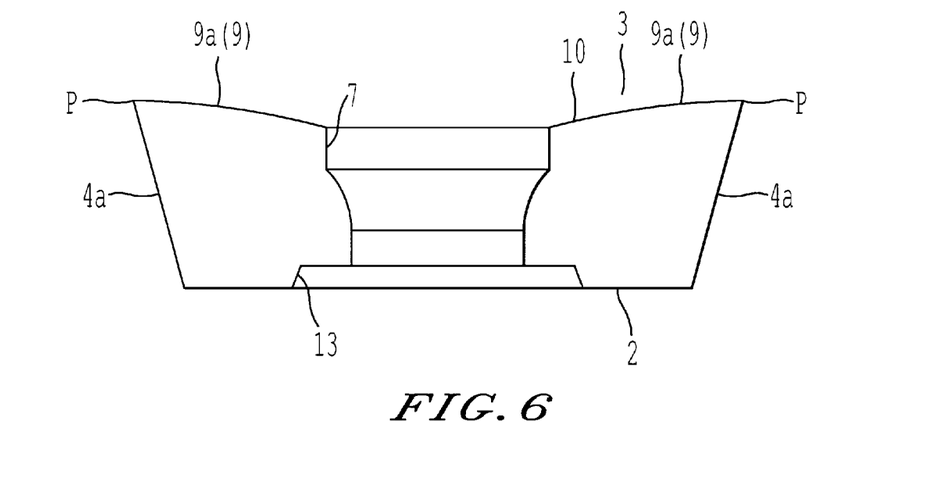
FIG. 6 is a sectional view along line D—D of the throwaway insert shown in FIG. 1.
Figure 7:
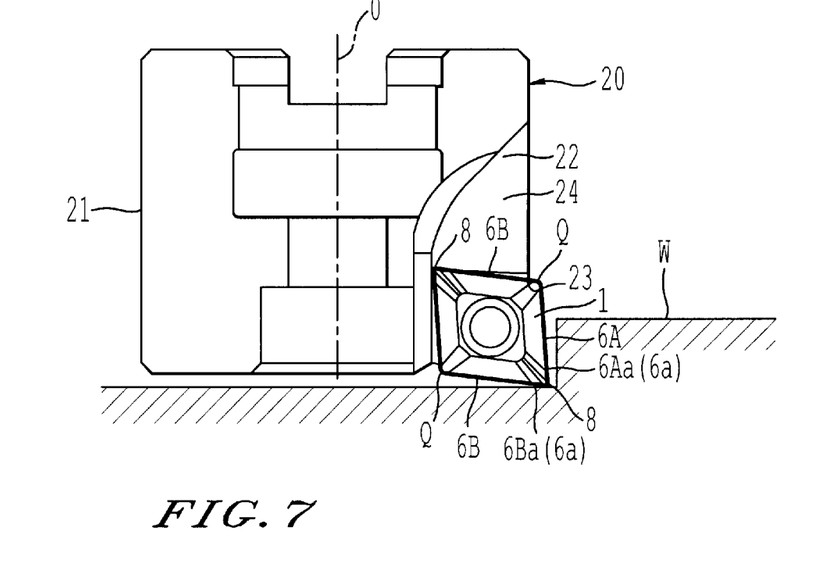
FIG. 7 is a longitudinal-sectional view at an intermediate portion of a plunging-milling cutter mounted with the throwaway insert according to the embodiment of the present invention.
Figure 8:
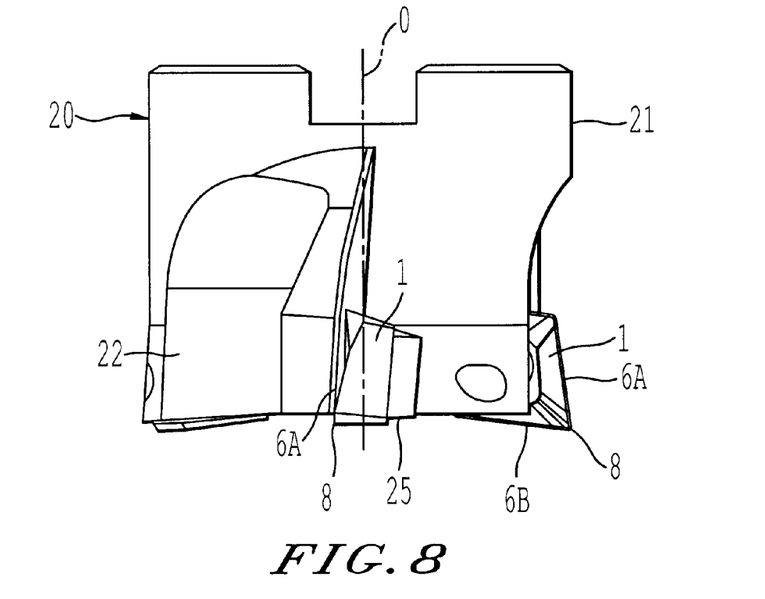
FIG. 8 is a side view from the right of the plunging-milling cutter shown in FIG. 7.
Figure 9:
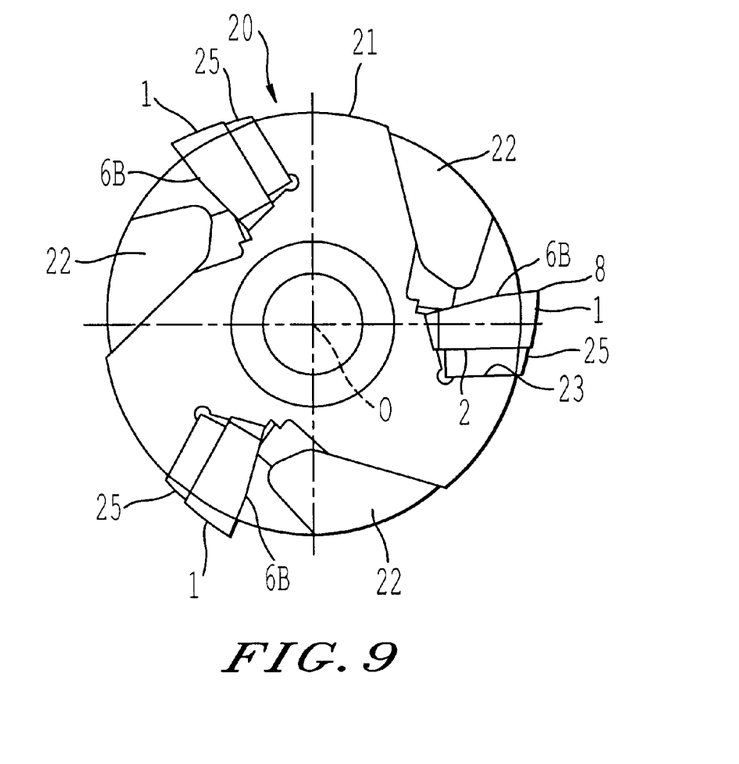
FIG. 9 is a bottom view of the plunging-milling cutter shown in FIG. 7.
Figure 10:
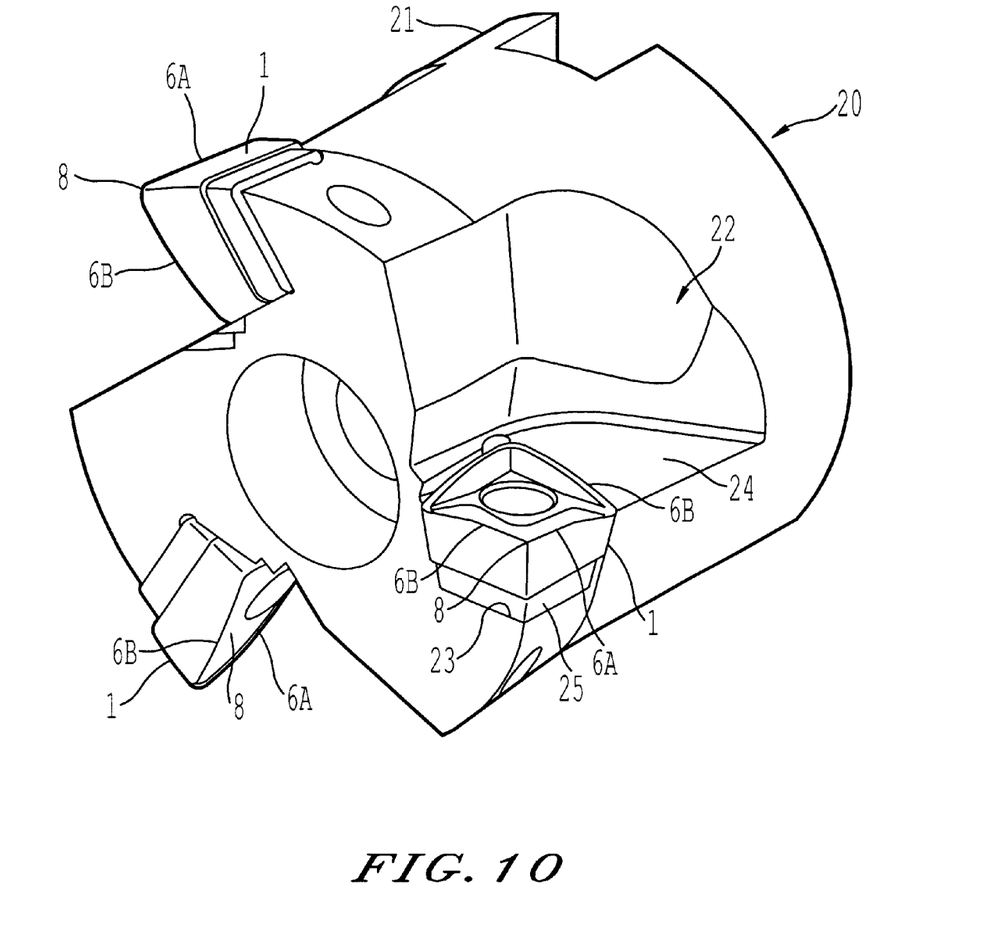
FIG. 10 is perspective view of an end part of the plunging-milling cutter shown in FIG. 7.
Figure 11:
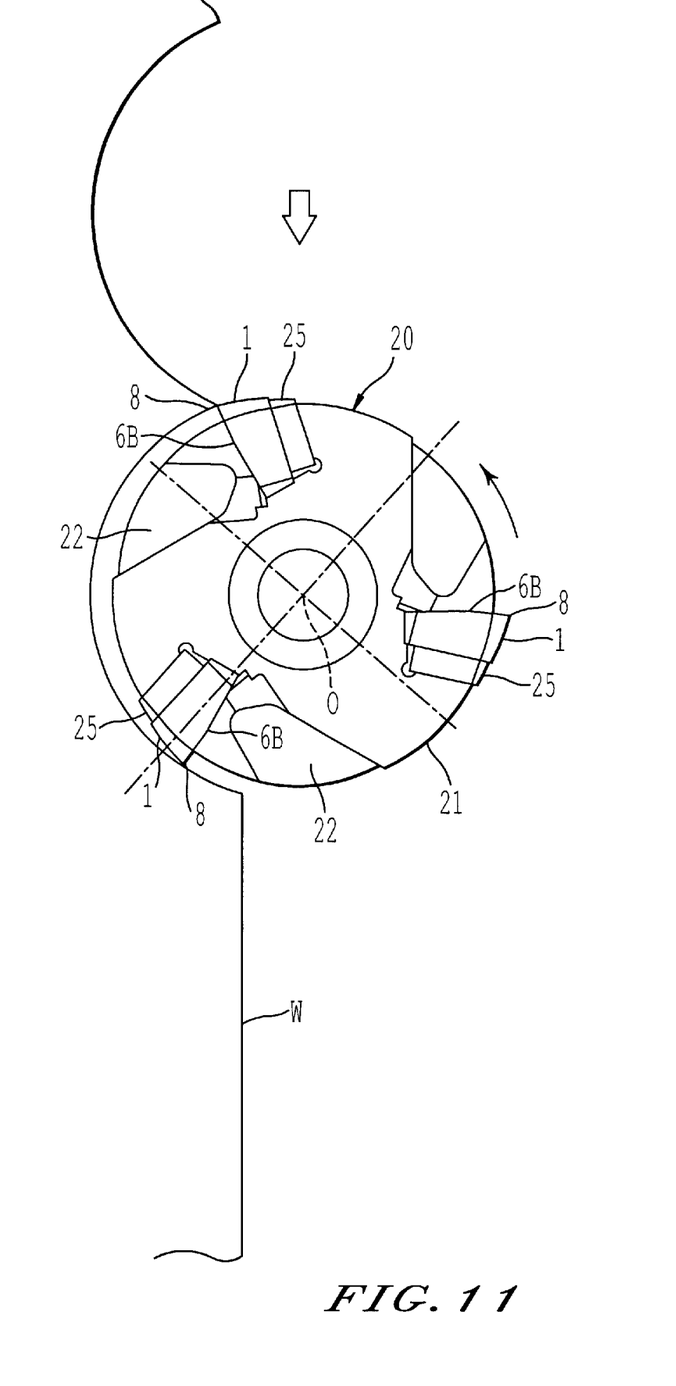
FIG. 11 is a bottom view of the plunging-milling cutter performing plunging-milling, according to the embodiment of the present invention.

A throwaway insert according to an embodiment of the present invention is shown in FIGS. 1 to 6. FIG. 1 is a plan view of the throwaway insert. FIG. 2 is a side view in a direction A of the insert shown in FIG. 1. FIG. 3 is a side view in a direction B of the insert shown in FIG. 1. FIG. 4 is an expanded view of a portion C of the insert shown in FIG. 1. FIG. 5 is a partial side view of a nose part of the insert shown in FIG. 4. FIG. 6 is a sectional view along line D—D of the insert shown in FIG. 1. FIG. 7 is a longitudinal-sectional view at an intermediate portion of a plunging-milling cutter mounted with the throwaway insert. FIG. 8 is a side view from the right of the plunging-milling Cutter. FIG. 9 is a bottom view of the plunging-milling cutter. FIG. 10 is a perspective view of an end part of the plunging-milling cutter. FIG. 11 is a bottom view of the plunging-milling cutter performing plunging-milling, according to the embodiment of the present invention.

A throwaway insert 1 shown in FIGS. 1 to 6 is made of, for example, cemented carbide or the like, and is formed in a substantially polygonal-planar shape, in particular, in a substantially quadrilateral-planar shape. The throwaway insert 1 in the drawings is formed in a rhombic-planar shape. The throwaway insert 1 is provided with a lower face 2 serving as a mounting face, an upper face 3, opposite to the lower face 2, provided with rake faces, and four side faces 4 individually serving as relief faces. A cutting edge 6 is formed at each ridge of the sides at which the side faces 4 respectively merge with the upper face 3. The side faces 4 individually tilt to the outside from the lower face 2 toward the upper face 3 so as to serve as relief faces having positive relief angles, whereby the throwaway insert 1 is formed as a positive insert. The relief angles may be 0° so as to be substantially negative.

A screw-passing-hole 7 is formed passing through between the upper and lower faces at a center of the upper face 3. The throwaway insert 1 is provided with a pair of corners P opposite to each other having acute angles and a pair of corners Q opposing each other having obtuse angles. The acute-angle corners P are individually provided with nose parts 8 to be used for cutting into a workpiece during cutting operation. The throwaway insert 1 may be provided with flat clamping faces instead of the screw-passing-hole 7.

In FIGS. 1 and 4, each of a pair of the cutting edges 6 merging with each other at the nose part 8 is formed in a substantially arc-shape having a line protruding toward the outside at an intermediate part thereof A straight sub-cutting-edge 6a is formed in a part of each cutting edge 6 continuing from the corner P and the remaining part of the cutting edge 6 between the sub-cutting-edge 6a and the obtuse-angle corner Q is formed in the arc-shape having a convex-curved line. Each cutting edge 6 formed in a convex-curved shape, except for the sub-cutting-edge 6a which is linearly formed, is inclined as a whole so that the distance to the lower face 2 is greatest at the corner P and decreases toward the obtuse-angle corner Q.

The sub-cutting-edge 6a may be formed in parallel to the lower face 2.

At the upper face 3, the inner part of each cutting edge 6 from a land 12 serves as a rake face 9 having a positive rake angle in which the distance between the upper face 3 and the lower face 2 decreases from the land 12 toward the central screw-passing-hole 7 so as to have, for example, a convex-curved face or a planar face A bottom face 10 is provided at the inner side of the rake faces 9 and around the screw-passing-hole 7. The bottom face 10 is formed substantially in parallel to the lower face 2. Each rake face 9 is inclined from a merged part 9*a*, at which the rake face 9 merges with the adjacent rake face 9 at the corner P, toward the obtuse-angle corner Q so that the distance of the rake face 9 to the lower face 2 decreases toward the obtuse-angle corner Q along the cutting edge 6.

Bottom parts 9*b* of the rake faces 9 disposed along a diagonal line R shown by a one-dot-chain line between a pair of the obtuse-angle corners Q shown in FIG. 1 are individually inclined so that the distances of the bottom parts 9*b* to the lower face 2 individually decreases from connected parts thereof with the bottom face 10 toward the outside. Therefore, each rake face 9 of the upper face 3 forms a twisted-inclined face becoming closer to the lower face 2 from the merged part 9*a* in the vicinity of the nose part 8 toward the bottom part 9*b* disposed on the diagonal line R between the obtuse-angle corners Q.

In plan views of the throwaway insert 1 shown in FIGS. 1 and 4, the sub-cutting-edges 6*a* of the adjacent two cutting edges 6 merge with each other at the nose part 8 substantially perpendicular to each other, for example, at an angle of 90°30' (±30"). The adjacent two cutting edges 6 form an acute angle θ, for example, 80° therebetween at portions of the cutting edges 6 respectively disposed in the vicinity of the sub-cutting-edges 6*a* toward the obtuse-angle corners Q.

At each side face 4, corner-side face 4*a* of the corner P is formed in a substantially convex-curved shape along an arced ridgeline of the corner P. A first side face 4*b* merging with the sub-cutting-edge 6*a* of the cutting edge 6 is planarly formed, and a second side face 4*c* which merges with the remaining part of the cutting edge 6 is formed in a convex-curved shape, for example, substantially in a shape of a part of the periphery of a cylinder along an arc of the cutting edge 6.

A concave mounting-face part 13 of which the diameter is larger than the inner diameter of the screw-passing-hole 7 is formed in the lower face 2 around the screw-passing-hole 7.

The throwaway insert 1 thus formed, in plan view in FIG. 1, has rotational symmetry with respect to the center of the screw-passing-hole 7, and line symmetry with respect to the diagonal line R between the obtuse-angle corners Q.

A plunging-milling cutter as an example of a rotating tool is described below with reference to FIGS. 7 to 11, the plunging-milling cutter being mounted with the throwaway inserts 1 having the above configuration, according to the present embodiment.

In FIGS. 7 to 10, a substantially cylindrical tool part 21 rotates about a central axis O of a plunging-milling cutter 20. Insert pockets 22 are formed by cutting away the tool part 21 at the periphery of an end thereof at a predetermined distance between each insert pocket 22 (for example, three insert pockets 22 are shown in the drawings). Each insert pocket 22 is provided with a concave insert-mounting base 23 formed at a peripheral part of the insert pocket 22 toward the end of the tool part 21. The throwaway insert 1 is fixed to each insert-mounting base 23 via a seat 25.

The plunging-milling cutter 20 is mainly used for plunging-milling, and can also be used for planing and oblique cutting.

Each throwaway insert 1 mounted on the seat 25 which is mounted on a bottom wall of the insert-mounting base 23 is positioned so that the upper face 3 faces the rotational leading side of the tool part 21 and the nose part 8 protrudes from the periphery of the end of the tool part 21. One of the cutting edges 6 adjacent to the nose part 8 is positioned at the peripheral side so as to serve as a peripheral cutting edge 6A and the other one of the cutting edges 6 is positioned at the end of the tool part 21 so as to serve as a facing cutting edge 6B.

A (sub-cutting-edge 6A*a*) of the peripheral cutting edge 6A is disposed substantially parallel to the axis O of the tool part 21, and (a sub-cutting-edge 6B*a*) of the facing cutting edge 6B is disposed perpendicular to the axis O. Therefore, a portion of the peripheral cutting edge 6A continuing from the (sub-cutting-edge 6A*a*) is positioned at an acute angle with respect to the portion of the facing cutting edge 6B continuing from the (sub-cutting-edge 6B*a*), whereby the portion of the peripheral cutting edge 6A is recessed to the axis O gradually along the convex-curved line thereof toward the base end side of the tool part 21, and the portion of the facing cutting edge 6B continuing from the (sub-cutting edge 6B*a*) is recessed to the base end side of the tool part 21 gradually along the convex-curved line thereof toward the inner side in a radial direction of the tool part 21.

As shown in FIGS. 7 and 11, in each insert pocket 22 of the tool part 21, a chip-transfer face 24 for transfer cut chips to the base-end side is provided toward the base-end side of the cutting edge (facing cutting edge 6B) adjacent the nose part 8, which is not used for cutting and is positioned toward the base end and opposite to the facing cutting edge 6B used for cutting. The chip-transfer face 24 is inclined to the trailing side of the rotation of the tool part 21 from the inner side (the axis O side) toward the outer side in a radial direction in accordance with the position of the facing cutting edge 6B which is not used for cutting and is inclined to the trailing side of the rotation of the tool part 21 (to the lower face 2 side of the insert 1) from the inner side toward the outer side in a radial direction. The inclined chip-transfer face 24 having a flat or convex-curved surface merges with the peripheral surface of the tool part 21.

For example, as shown in FIG. 11, the plunging-milling cutter 20 having the above configuration rotates the tool part 21 about the axis O, thereby performing plunging-milling by cutting into a material W in a direction along the axis O, and traverse-cutting of the material W in a direction substantially perpendicular to the axis O. The operation is performed intermittently by the throwaway inserts 1 disposed in the tool part 21 at a predetermined distance therebetween in the peripheral direction of the tool part 21.

The plunging-milling cutter 20 can perform plunging-milling by performing primary cutting, for example, rough cutting by using the facing cutting edge 6B of each throwaway insert 1 disposed substantially perpendicular to the axis O, and by performing medium-rough-finish cutting by using the sub-cutting edge 6A*a* disposed in the vicinity of the outermost protruding nose part 8 of the peripheral cutting edge 6A.

The cut-in operation of the facing cutting edge 6B varies according to the position of the insert 1 mounted to the tool part 21, and the cut-in operation in a case shown in FIG. 11 is described below.

When the depth of cut in a radial direction of the rotating tool part 21 is small, the facing cutting edge 6B of each throwaway insert 1 cuts into the material W at an outside region of the facing cutting edge 6B in the vicinity of the corner P of the nose part 8 which is a tip of the facing cutting edge 6B, and the cut region gradually expands toward the inner side, that is, toward the axis O side, of the facing cutting edge 6B having a convex-curved shape.

When the depth of cut in a radial direction of the rotating tool part 21 becomes larger, the facing cutting edge 6B of each throwaway insert 1 cuts into the material W at a intermediate region in the radial direction of the convex-curved facing cutting edge 6B, the intermediate region most protruding to the rotational leading side, and the cut region gradually expands toward the outer side and the inner side of the facing cutting edge 6B in the radial direction.

Since the facing cutting edge 6B cuts into a material at a single point of the facing cutting edge 6B, when the depth of cut in the radial direction is either small or large, and the cut region gradually expands, impact on the facing cutting edge 6B when cutting into the material becomes small, thereby suppressing damages to the cutting edge. Cut chips produced by the facing cutting edge 6B are transferred along the rake face 9 of the upper face 3 and through the portion along the diagonal line R which is the most recessed portion, and are curled and broken at the rake face side of the nose part 8 which is not used for cutting. The cut and broken chips are transferred along the diagonal line R to the tool-part base-end side of the insert 1 and along the chip-transfer face 24 of the insert pocket 22, and are discharged to the outside from the base end side of the tool part 21.

When traverse-cutting is performed by using the plunging-milling cutter 20, primary cutting is performed by the peripheral cutting edge 6A, and medium-rough-finish cutting of a workpiece surface is performed by using the sub-cutting-edge 6Ba of the facing cutting edge 6B, as shown in FIG. 7.

Since the convex-curved peripheral cutting edge 6A is inclined to the trailing side of the rotation from the end of the tool part 21 toward the base end thereof, the cut chips are transferred along the rake face 9 of the upper face 3 toward the base end side, are curled and bent at the region along the diagonal line R, are further transferred to the base end side, and are discharged via the chip-transfer face 24.

Although in the above description, the throwaway insert 1 is mounted to the right-hand tool part 21, the throwaway insert 1 may be used for cutting by being mounted to a left-hand tool part.

Although in the above description, the throwaway insert 1 according to the present embodiment is used for plunging-milling and traverse-cutting, the throwaway insert 1 may be used for three-dimensional cutting such as oblique cutting.

The throwaway insert 1 according to the present embodiment can be mounted to either a right-hand or left-hand tool part. When the throwaway insert 1 is used for rough cutting, medium-rough-finish cutting for plunging-milling along the axis O can be performed by using the sub-cutting-edge 6Aa of the peripheral cutting edge 6A, and the medium-rough-finish cutting for traverse-cutting in a direction substantially perpendicular to the axis O can be performed by using the sub-cutting-edge 6Ba of the facing cutting edge 6B. The cutting strength is made large because the thickness of the insert 1 is greatest at the nose part 8, and cut chips are curled and bent on the upper face 3 and are guided to be discharged to the base end side along the upper face 3 because the thickness of the insert 1 is smallest at the region disposed along the diagonal line R between the obtuse-angle corners Q. Each cutting edge 6 is formed in a convex-curved shape so that the thickness of the inset 1 gradually decreases from the nose part 8 toward the obtuse-angle corner Q, whereby impact when cutting in during cutting operation becomes small, thereby efficiently suppressing damages to the cutting edge 6.

In the plunging-milling cutter 20 according to the embodiment, impact when cutting in during cutting operation is small and damages can be efficiently suppressed, and cut ships can be smoothly discharged to the base end side and the periphery side, and the chip-transfer face 24 of the insert pocket 22 is disposed inclined at the base end side of the insert 1 from the inner side toward the outer side along the facing cutting edge 6B disposed at the base end side, the chip-transfer face 24 being inclined to the trailing side of the rotation of the tool part 21, whereby the chips can be more smoothly discharged.

Although according to the above embodiment, the cutting edges 6 of the throwaway insert 1 are formed in a convex-curved shape, the inclined cutting edges 6 may be linearly formed. The shape of the insert 1 is not limited to a rhombic shape and to a shape in plan view having line symmetry with respect to the diagonal line R or rotational symmetry, and the insert 1 may have any shape as long as the insert 1 has the nose part 8.

The present invention is not limited to the plunging-milling cutter 20, and it may be applied to various throwaway-type cutters such as rotating tools including an end mill and a milling cutter, and turning tools.

Reference numerals

| | |
|---|---|
| 1: | throwaway insert |
| 2: | lower face (mounting face) |
| 3: | upper face |
| 4: | side face |
| 4a: | corner-side face |
| 4b: | first side face |
| 4c: | second side face |
| 6: | cutting edge |
| 6A: | peripheral cutting edge |
| 6B: | facing cutting edge |
| 6a, 6Aa, and 6Ba: | sub-cutting-edge |
| 7: | screw-passing-hole |
| 8: | nose part |
| 9: | rake face |
| 9a: | merged part |
| 9b: | bottom part |
| 10: | bottom face |
| 12: | land |
| 13: | concave mounting-face part |
| 20: | plunging-milling cutter |
| 21: | tool part |
| 22: | insert pocket |
| 23: | insert-mounting base |
| 24: | chip-transfer face (inclined face) |
| 25: | seat |
| P: | corner |
| Q: | obtuse-angle corner |

What is claimed is:

1. A throwaway insert comprising:
a pair of cutting edges merging with each other at a nose part of an upper face opposite to a mounting face, the pair of cutting edges, which individually include sub-cutting-edges in the vicinity of the nose part, being individually inclined so as to be closer to the mounting face from the nose part toward portions of the respective cutting edges away from the nose part, the sub-cutting-edges forming a substantially right angle therebetween, wherein the sub-cutting-edges are each formed substantially in a straight line.

2. The throwaway insert according to claim 1, wherein the pair of cutting edges are each formed substantially in a convex-curved shape.

3. The throwaway insert according to claim 1, wherein the pair of cutting edges form an acute angle of smaller than ninety degrees therebetween at the respective portions continuing from the sub-cutting-edges.

4. The throwaway insert according to claim 1, wherein the throwaway insert is formed in a substantially quadrilateral-planar shape, a pair of the nose parts of the upper face are individually provided at opposite corners of the substantially quadrilateral-planar throwaway insert, and rake faces on the upper face are individually formed inclined so that the distances of the rake faces to a lower face individually decrease from the nose parts toward a diagonal line between a pair of the remaining corners of the substantially quadrilateral-planar throwaway insert.

5. The throwaway insert according to claim 1, wherein the pair of cutting edges are each formed substantially in a convex-curved shape and form an acute angle of smaller than ninety degrees therebetween at the respective portions continuing from the sub-cutting-edges.

6. The throwaway insert according to claim 1, wherein the pair of cutting edges are each formed substantially in a convex-curved shape, and the throwaway insert is formed in a substantially quadrilateral-planar shape, a pair of the nose parts of the upper face are individually provided at opposite corners of the substantially quadrilateral-planar throwaway insert, and rake faces on the upper face are individually formed inclined so that the distances of the rake faces to a lower face individually decrease from the nose parts toward a diagonal line between a pair of the remaining corners of the substantially quadrilateral-planar throwaway insert.

7. The throwaway insert according to claim 1, wherein the pair of cutting edges form an acute angle of smaller than ninety degrees therebetween at the respective portions continuing from the sub-cutting-edges, the throwaway insert is formed in a substantially quadrilateral-planar shape, a pair of the nose parts of the upper face are individually provided at opposite corners of the substantially quadrilateral-planar throwaway insert, and rake faces on the upper face are individually formed inclined so that the distances of the rake faces to a lower face individually decrease from the nose parts toward a diagonal line between a pair of the remaining corners of the substantially quadrilateral-planar throwaway insert.

8. The throwaway insert according to claim 1, wherein the pair of cutting edges are each formed substantially in a convex-curved shape and form an acute angle of smaller than ninety degrees therebetween at the respective portions continuing from the sub-cutting-edges, the throwaway insert is formed in a substantially quadrilateral-planar shape, a pair of the nose parts of the upper face are individually provided at opposite corners of the substantially quadrilateral-planar throwaway insert, and rake faces on the upper face are individually formed inclined so that the distances of the rake faces to a lower face individually decrease from the nose parts toward a diagonal line between a pair of the remaining corners of the substantially quadrilateral-planar throwaway insert.

9. A throwaway-type cutter comprising:

a throwaway insert including a pair of cutting edges merging with each other at a nose part of an upper face opposite to a mounting face, the pair of cutting edges, which individually include sub-cutting-edges in the vicinity of the nose part, being individually inclined so as to be closer to the mounting face from the nose part toward portions of the respective cutting edges away from the nose part, the sub-cutting-edges forming a substantially right angle therebetween, the sub-cutting-edges are each formed substantially in a straight line, the throwaway insert being mounted so that the nose part is positioned at the periphery of an end of a tool part, wherein one of the pair of cutting edges serves as a peripheral cutting edge, the sub-cutting-edge of the one of the pair of cutting edges being disposed substantially in parallel to an axis of the tool part, and the other one of the pair of cutting edges serves as a facing cutting edge, the sub-cutting-edge of the other one of the pair of cutting edges being disposed substantially perpendicular to the axis of the tool part.

10. The throwaway-type cutter according to claim 9, wherein the throwaway insert is mounted in an insert pocket of the tool part in a manner such that a surface disposed in a region at a tool-part base-end side of the throwaway insert mounted in the insert pocket is inclined to the mounting face of the throwaway insert from the inner side of the tool part toward the outer side thereof.

11. The throwaway-type cutter according to claim 10, wherein a surface of the insert pocket is inclined to the mounting face side of the throwaway insert from the inner side of the tool part toward the outer side thereof along a ridgeline opposite to the facing cutting edge of the throwaway insert.

\* \* \* \* \*